June 13, 1967 D. W. SHEPHERD ET AL 3,325,151
CONCRETE MIXING AND BATCHING PLANT
Filed Jan. 22, 1965 5 Sheets-Sheet 1

INVENTORS
DONALD WELTON SHEPHERD
BRYAN OLIVER SHEPHERD
BY
Bacon & Thomas
ATTORNEYS June 13, 1967 D. W. SHEPHERD ET AL 3,325,151
CONCRETE MIXING AND BATCHING PLANT
Filed Jan. 22, 1965 5 Sheets-Sheet 4

INVENTORS
DONALD WELTON SHEPHERD
BRYAN OLIVER SHEPHERD
BY
Bacon & Thomas
ATTORNEYS INVENTORS
DONALD WELTON SHEPHERD
BRYAN OLIVER SHEPHERD
BY
Bacon & Thomas
ATTORNEYS

United States Patent Office 3,325,151
Patented June 13, 1967

3,325,151
CONCRETE MIXING AND BATCHING PLANT
Donald W. Shepherd, Dringhouses, York, and Bryan Oliver Shepherd, Christchurch, England, assignors to Portasilo Limited, York, England, a British company
Filed Jan. 22, 1965, Ser. No. 427,359
Claims priority, application Great Britain, Jan. 31, 1964, 4,257/64, 4,258/64
16 Claims. (Cl. 259—160)

This invention relates to improvements in concrete mixing and batching plants. Batching plants at present generally in use comprise separate units e.g. a concrete mixer, cement silo, aggregate bunker and batch weigher. These units normally have to be positioned on a building site using cranes which takes time, and the individual units take up a considerable amount of ground space.

Portable plants are also known in which the units are mounted on a wheeled chassis, the plant including a reversible and rotatable drum type mixer and a cement silo. In this known arrangement the mixer is spaced horizontally from the cement silo on the chassis and the silo can be pivoted from its erect position so as to lie along the length of the wheeled chassis to enable the portable plant to be towed for instance under bridges. Such a portable plant is very bulky and is expensive because of the cost of the wheels and chassis.

It is an object of the present invention to provide a compact, and efficient concrete mixing and batching plant which occupies only a small space on a building site and which can be readily moved from site to site.

According to the present invention there is provided a concrete mixing and batching plant including a framework which when erected for use in an upright position has a storage container or silo for cement at the upper portion thereof and a concrete mixer at the lower portion thereof, the mixer being mounted for movement between a lower position in which it can receive aggregate to be mixed and an elevated position from which mixed concrete can be discharged.

Thus the silo and mixer take up substantially the same ground space as the silo by itself, and the movability of the mixer has the advantage that discharge of concrete into dumpers or barrows is facilitated while aggregate can be fed into the mixer at substantially ground level.

The mixer may be of any suitable type but is preferably of a type open at the top for filling, for instance a trough type mixer or a pan type mixer. In particular an annular pan type mixer is preferred, i.e. a mixer having a stationary annular mixing pan into which extend a number of mixing blades which are driven around the pan. A trough type mixer is a mixer having a generally trough shaped container in which are disposed mixing blades which rotate about an axis extending generally along the length of the trough.

Though the silo may be arranged to discharge cement into the mixer when the latter is in the elevated position, it is preferred that the silo discharges cement into the mixer when the mixer is in the lower position. Mixing can then be arranged to take place while the mixer is being moved from the lower to the elevated position, which shortens the mixing cycle.

The plant is readily portable by moving the whole framework of the plant on a lorry or trailer preferably by tilting it about one side thereof. To enable the plant to be readily tilted and loaded onto a vehicle the framework is preferably equipped with handling gear to facilitate such movements.

The mixer in plan view will be smaller than the base of the framework and may if desired be moved up and down in a vertical line. It may be raised and lowered on a suitably disposed track by means of a cable and winch or, as is the case in a preferred embodiment, it may be raised and lowered by means of a lever arm hingedly connected to the framework so that it describes an arc of a circle. While in its lower position the mixer may be disposed centrally of the framework, the movement is preferably so arranged that the lower position is close to one side of the framework and the elevated position for discharge is close to the opposite side of the framework. With a pan type mixer a discharge aperture in the mixer is preferably so disposed as to lie adjacent the framework in the elevated position for ease of discharge into barrows or dumpers which can move beneath it. Where a trough type mixer is employed it will preferably be discharged by tilting it about an axis parallel to the trough. In order that the mixer may remain horizontal while moving from the lower to the elevated positions a guide rod is preferably provided which is hingedly connected both to the mixer and to the framework so as to form together with the lever arm a parallel link system. (It is to be understood that the links do not themselves have to be parallel so long as lines connecting the two hinge points on each link are parallel.)

The mixer and other moving parts e.g. the lever arm to raise and lower the mixer during operation, may be driven by an electric or other motor or motors, but all the power required by the plant is preferably produced from a single power unit driving a hydraulic pump which serves to transmit the power through hydraulic leads to e.g. a hydraulic motor to drive the mixer and a hydraulic piston working in a cylinder to raise and lower the mixer. The power unit and the hydraulic pump are preferably mounted on the plant within the framework. The power unit may for instance be a diesel or petrol engine or an electric motor. Preferably the plant is arranged for automatic operation through a complete cycle of operation which include the steps of charging the mixer with aggregate, cement, and water, mixing the concrete, raising the mixer, discharging the concrete and lowering the mixer again. It is of advantage to provide a single control panel from which such operation can be controlled either manually or automatically.

Where the mixer in its lower position is to one side of the framework, the silo preferably has its discharge outlet offset with respect to the center-line of the plant so as to discharge directly into the mixer. This offsetting has the advantage that when the plant is empty the center of gravity is to one side which assists in tilting the plant when it is to be transported. However when the silo is full of cement the center of gravity is more nearly on the center line so that plant will have adequate stability. To increase the eccentricity of the center of gravity the ower unit and hydraulic pump are preferably mounted to one side of the plant.

Preferably the mixer is associated with means to provide an indication of the weight of the contents of the mixer, e.g. the aggregate to be mixed. This may be arranged by mounting the mixer on a subframe which bears against a load cell which may be hydraulic or electric and which registers the weight of the contents of the mixer. The sub-frame may be connected to the frame-work via a parallel link system known per se so that the same weight is registered whatever the position of the mixer or whatever the load in the mixer may be. Means may be provided for weighing the cement independently of the aggregate, preferred means which are known per se, and may comprise a weighing dispenser mounted at the discharge end of the cement silo and connected thereto by a canvas sleeve. The cement dispenser may fill during the mixing cycle and a weighed quantity may be discharged when required.

The water required for the concrete may be weighed, measured by volume or fed through a meter. Preferably a water tank is provided on the plant which may be filled during the mixing cycle, a measured quantity being discharged quickly when required.

It is frequently a problem that some cement is blown by the wind as it is discharged into the mixer and is lost. To overcome this difficulty means are preferably provided adapted in operation to discharge a spray or curtain of water which serves to enclose the cement during is discharge into the mixer.

The water discharge means is preferably arranged to provide a spray or curtain of water which substantially completely envelopes the discharge of cement, although where such a discharge is partially shielded by, for instance, a chute, the water discharge means may be arranged to envelope only the exposed side of the cement discharge. Where there is a cement dispenser the water discharge means may surround the dispensing aperture of the dispenser.

Thus the likelihood of cement being lost is reduced, and there is also the advantage that the cement and water can be at least partially mixed by the time they reach the mixer.

The water discharge means can be a pipe with a thin continuous slot or a number of small spaced perforations disposed so that a downwardly directed spray is produced. Preferably the pipe is in the shape of a ring and completely surrounds the aperture. If desired however a series of pipes having nozzles suitably arranged to provide the desired curtain of water may be provided.

Preferably there are control means for cement discharge and control means for water discharge which are operatively interconnected so that cement and water are discharged simultaneously.

The water tank may be disposed around the outside of the cement dispenser, and the water may be weighed by the means which serve to weight the cement.

The silo may be divided into compartments to hold more than one type of cement.

One side of the framework may be closed in so as to form the back wall of a bunker for the storage of aggregates. The bunker may be partitioned so as to hold different materials in separate compartments. The side of the framework forming the back wall of the bunker is preferably the side nearest the mixer in its lower position. Thus by providing a suitable closable aperture in the back wall of the bunker aggregate can be arranged to pour directly into the mixer when the aperture is opened if desired during the automatic working cycle of the plant.

If desired a winch may be connnected to the framework for association with a scraper shovel for piling aggregate up against the bunker wall or introducing it into the mixer.

One advantage of this arrangement is that the aggregate can first be piled up to a considerable height which enables the whole plant to be operated by only one man.

In order that the invention may be well understood a preferred embodiment will now be described by way of example only, with reference to the accompanying drawings in which.

Figure 1:
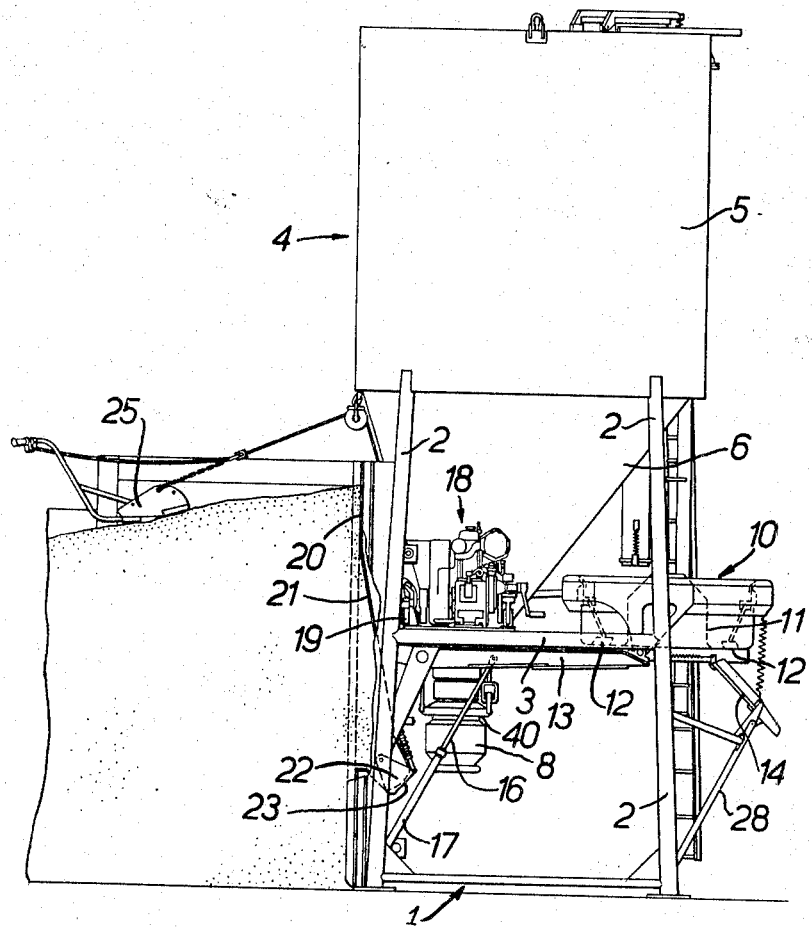
FIG. 1 shows a side elevation of a concrete mixing and batching plant, according to the invention with the mixer in the elevated position.

A concrete mixing and batching plant according to the invention comprises a framework 1 consisting of four legs 2 with suitable cross bracing members 3. Supported by the framework at the upper portion thereof is a cement silo 4. The cement silo 4 consists of an upper cylindrical part 5 and a lower part 6 in the shape of an inverted cone at the apex of which there is a discharge 7. The cone is shaped so that the apex thereof is displaced to one side of the framework 1. Below the discharge 7 of the silo 4 is mounted a dispenser 8 for weighing and dispensing the cement. The dispenser 8 is connected to the silo 4 in such a way that cement can continuously flow into the dispenser 8 until a predetermined weight is reached. The connection between silo 4 and dispenser 8 is covered with a sleeve 9.

Below the silo 4 is movably mounted an annular pan type concrete mixer 10 i.e. a mixer having a stationary annular pan 11 into which extend a number of mixing blades 12 which are driven around the pan 11 by means of a motor 11a (FIG. 2) mounted on the mixer 10. The mixer 10 is mounted on lever arms 13 hinged to the framework 1 and can move in an arc from a position at approximately ground level (FIG. 2) to an elevated position (FIG. 1) at which concrete can be discharged from a discharge aperture (not shown) in the base of the mixer 10, via a chute 14 into dumpers or barrows which can be positioned below the mixer 10. A link 15 parallel to the arms 13 maintains the mixer 10 horizontal during movement from one position to the other. The mounting of the mixer 10 is arranged so that in the lower position it lies below the cement dispenser 8 and aggregate loading point as will be described.

The lever arms 13 of the mixer mounting are raised and lowered by means of hydraulically operated pistons 16 moving in cylinders 17.

Figures 4, 4A:
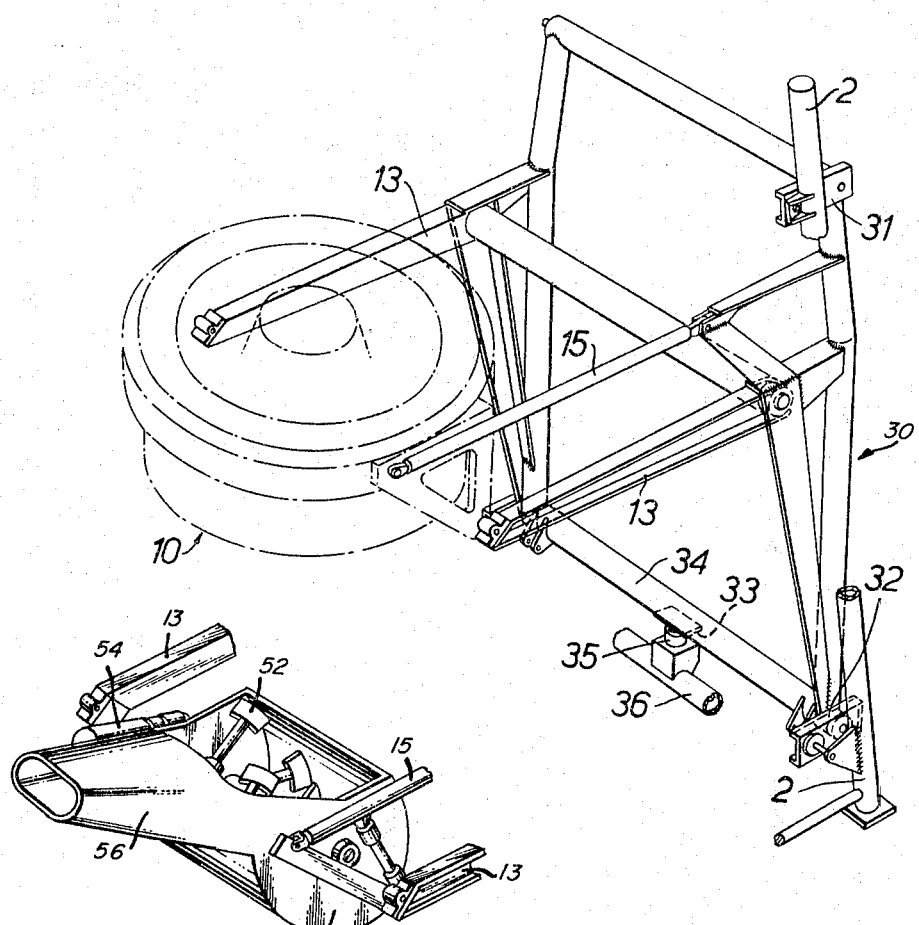
FIG. 4 is a detail of the plant in perspective showing the sub-framework which supports the mixer.
FIG. 4a is a fragmentary view, similar to a portion of FIG. 4, but showing a trough-type mixer.

In FIG. 4, the trough-type mixer 50 shown therein may be mounted on the same supporting elements 13 and 15 as shown in FIG. 4. The trough-type mixer 50 is provided with mixing paddles 52 mounted therein and driven in rotation by a suitable motor 54. As shown, the mixer 50 is provided with a discharge spout 56 for discharging the mixed material when the mixer is tilted.

A motor 18 and a hydraulic pump 19 are mounted within the framework 1 adjacent the cement silo 4 and serve, by means of suitable hydraulic leads (not shown) to drive the mixer 10 and raise and lower the mixer 10 and drive the other power operated features described below. The motor 18 and pump 19 are so positioned that they increase the eccentricity of the center of gravity of the plant due to the cement silo 4 being offset. When the silo 4 is full of cement the plant is adequately stable, but when empty the eccentricity of the center of gravity enables the framework 1 to be easily tilted about one side onto a trailer or lorry to transport it from site to site. During such transport the equipment will be secured in position and preferably the inlets to any liquid containers will be so arranged that in the travelling position they are upwardly directed.

The side of the framework 1 adjacent the mixer 10 in its lower position is provided with metal sheet or boarding to serve as the back wall 20 for an aggregate bunker. The part of the wall 20 just above the mixer is recessed inwardly at 21 and at the lower end of the recessed part 21 there is an aperture 22 which partly overlies the top of the mixer 10 when in its lowered position. The aperture 22 is provided with a pivoted door 23 which is hydraulically operated.

A hydraulically operated winch 24 associated with a scraper shovel 25 is provided for piling up aggregate against the back wall 20 of the bunker. By merely opening the door 23 in the bottom of the recess 21 aggregate will then pour into the mixer 10.

Figure 2:
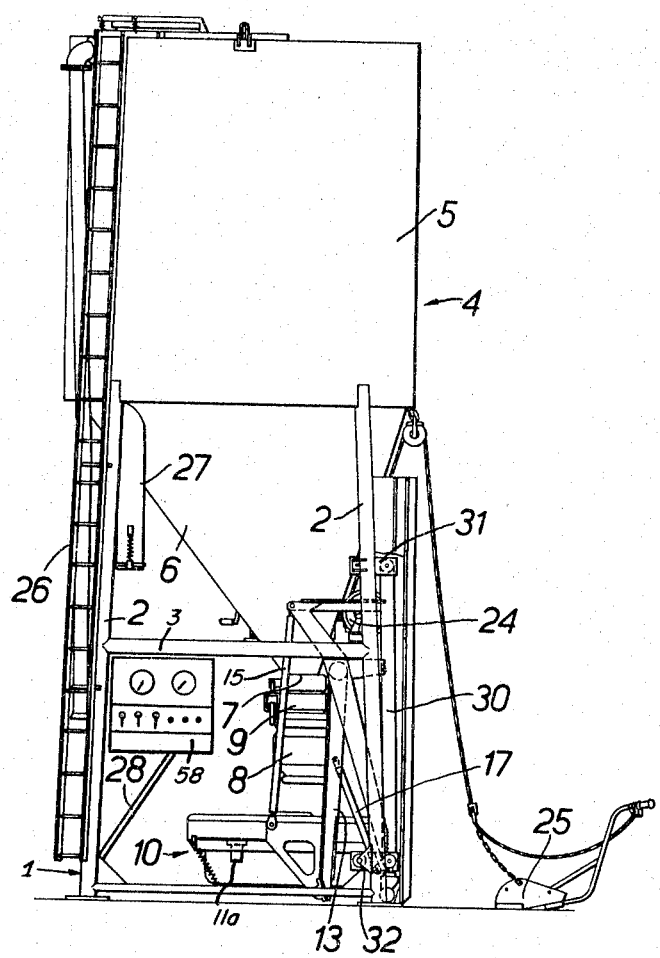
FIG. 2 shows a side elevation of the plant from the side opposite to that of FIG. 1 with the mixer in the lowered position.
Figure 3:
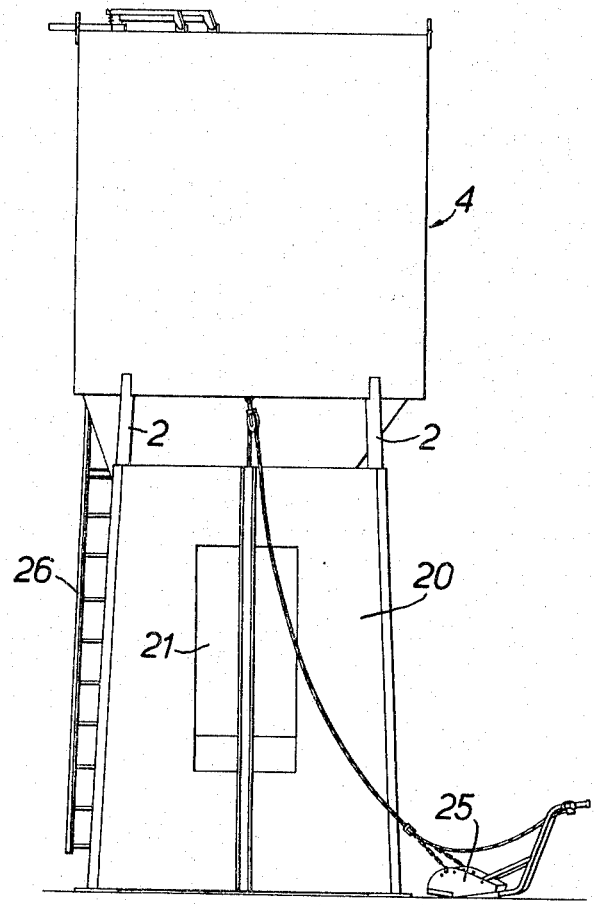
FIG. 3 shows a rear elevation of the plant.

A ladder 26 is secured to the framework 1 to provide access to the top of the silo 4 for inspection. A sleeve 27 extends downwardly from the upper part of the conical portions 6 of the silo 4 and serves to filter the air that leaves the silo as it is filled with cement. The chute 14 is supported by a framework 28 which can be folded inwardly of the framework as shown in FIG. 2 when not in use. In the folded position shown in FIG. 2 the framework also serves to retain the scraper shovel 25 in a stowed away position.

The mounting for the mixer 10 i.e. the lever arms 13 and the link 15 are not pivoted directly onto the main framework 1 but are pivoted to a sub-frame 30 shown in FIG. 4. The sub-frame 30 is pivoted at both sides by two short parallel links 31 and 32 to two of the legs 2 of the framework 1.

The links 31 and 32 allow the sub-frame 30 limited vertical movement, and when the mixer 10 is filled with aggregate a pad 33 which is secured to a member 34 of the sub-frame 30 bears against a load cell 35 which is mounted on a cross member 36 forming part of the framework 1. The load cell thus registers the total weight of the mixer 10, sub-frame 30 and the aggregate, but may be calibrated to register only the weight of aggregate. The parallel links 31 and 32 ensure that the same weight will be registered for a given load whatever the position of the mixer or the aggregate within the mixer.

Figure 5:
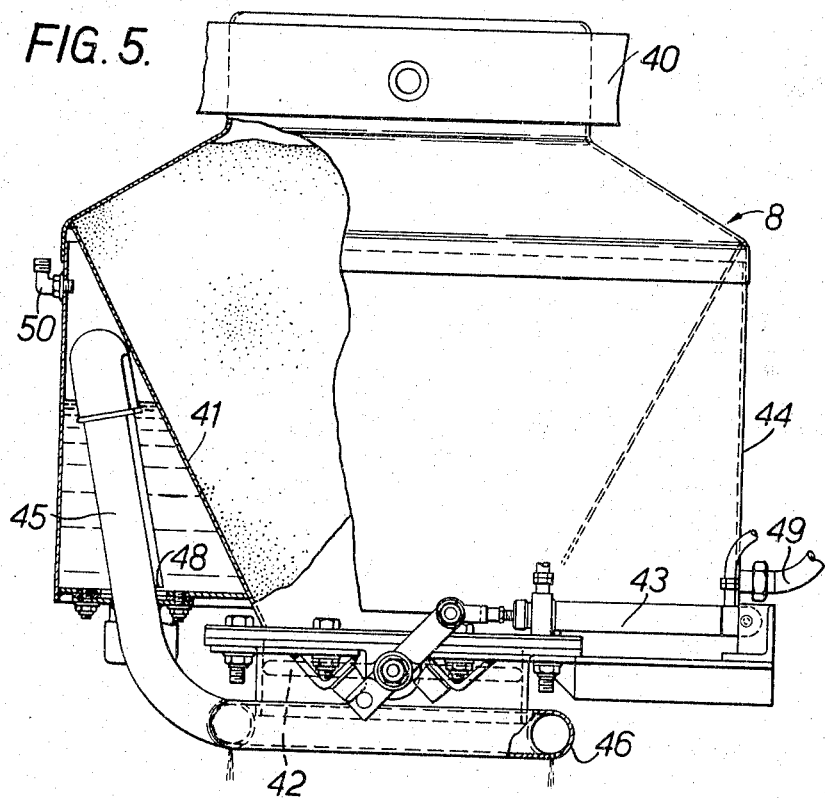
FIG. 5 is a detail of the plant showing a side elevation of the cement dispenser partially in cross section.
Figure 6:
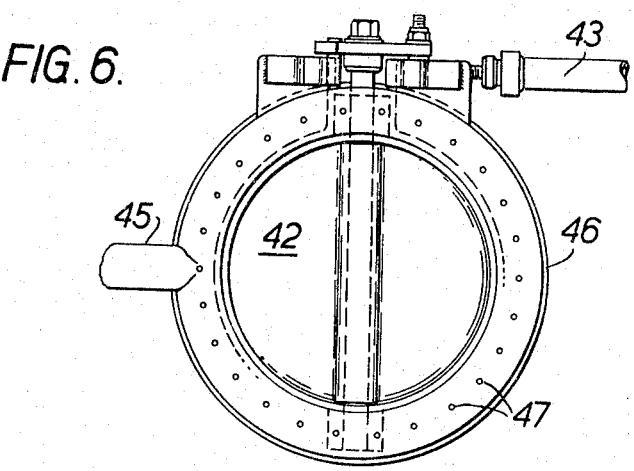
FIG. 6 is a bottom view of part of FIG. 5.

The cement dispenser 8 is pivoted to an arm 40 in a manner known per se and is arranged to allow only a predetermined quantity of cement to enter. As can be seen in FIG. 5 the dispenser has a container 41 in the form of a truncated cone which holds the cement and which is closed at the bottom by a butterfly valve 42 which is opened and closed by a double acting air piston and cylinder arrangement 43. Surrounding the conical container 41 is a tank 44 for water. A pipe 45 extends from the tank 44 to an annular pipe 46 surrounding the cement outlet. The pipe 46 is provided with a number of small apertures 47 on its underside. The upper end of the pipe 45 is U-shaped and the end 48 of the pipe 45 is just above the bottom of the tank 44. After the cement has been introduced into the dispenser 8 water is introduced into the tank 44 through a water inlet 49 until a predetermined weight is reached when the supply is cut off. To discharge the water air under pressure is introduced into the tank 44 through an air inlet 50 which forces the water up the pipe 45 into the pipe 46 and through the apertures 47 to form a spray or curtain of water around the cement discharge opening. The control means for the air to the inlet 50 and the air to the piston and cylinder 43 are operatively interconnected so that water and cement are discharged simultaneously.

The operation of the plant is as follows. When the plant has been erected on the site, the silo 4 is filled with cement, and aggregate is heaped against the wall 20 of the framework 1 by means of the scraper shovel 25. To mix concrete the mixer 10 is moved to its lowered position and the door 23 in the wall 20 of the bunker is opened to admit aggregate. When the mixer 10 is filled with the desired quantity of aggregate the door 23 is closed and cement and water are discharged into the mixer 10 from the dispenser 9 and water tank 44 respectively. The mixer 10 then mixes the concrete and simultaneously the mixer 10 is raised to its elevated position. When the concrete is mixed the discharge door in the bottom of the mixer 10 is opened and the concrete is discharged into a suitably placed dumper or barrow. The process is then repeated.

All the hydraulically powered operations are controlled from a single control plane 58 as shown in FIG. 2 mounted on the framework 1 and may be arranged for automatic operation, so that once the plant has been set up and supplied it can continue to supply mixed concrete with only a minimum of labor and supervision.

The control panel 58 is merely diagrammatically shown and is intended to indicate suitable controls and circuitry for effecting automatic operation, all of which are well known to those skilled in the art.

What we claim is:

1. A concrete mixing plant comprising: a framework; an open-topped nonrotatable container having movable mixing blades therein; swingable arm means mounting said container within said framework for movement along a single arcuate path from a lower position substantially at the bottom of said framework for receiving materials to be mixed to an elevated position from which mixed concrete can be discharged to a receiver adjacent said framework and above the bottom thereof; orienting means for holding the open top of said container uppermost during its movement along said arcuate path; and means on said container for moving said mixing blades therein whereby mixing may be performed while said container is moving from said lower to said elevated position.

2. A concrete mixing plant as defined in claim 1 wherein at least a portion of said container remains within said framework in all positions of said container along said path.

3. A concrete mixing plant as defined in claim 1 wherein said swingable arm means is pivoted on said framework over said lower position and extends substantially vertically downward to said container, to which its lower end is pivoted.

4. A concrete mixing plant as defined in claim 3, wherein said lower position is close to one side of said framework and said elevated position is close to the opposite side thereof.

5. A concrete mixing plant as defined in claim 1, wherein said orienting means comprises at least one guide rod pivoted to said framework and to said container and defining, with said swingable arm, a parallelogram linkage.

6. A concrete mixing plant as defined in claim 1, wherein said container is of generally trough shape and wherein said mixing blades are mounted for rotation about a first axis extending longitudinally of the trough; said trough being tiltable about a second axis parallel to said first axis, for discharging mixed concrete.

7. A concrete mixing plant as defined in claim 1, wherein the portion of said framework to which said swingable arm is pivoted comprises a subframe, said subframe being pivotally mounted on said framework and bearing on a weighing device for weighing the contents of said container.

8. A concrete mixing plant as defined in claim 1, wherein one side of said framework comprises a wall defining also the back wall of a bunker for the storage of aggregates; an opening in said wall at a position overlying the open top of said container when in its lower position; and a selectively operable closure for said opening whereby aggregate may pour through said opening into said container.

9. A concrete mixing plant as defined in claim 1, in which the plant is arranged for automatic operation through a complete cycle of operation including the steps of charging the mixer with aggregate, cement and water, mixing the concrete and raising the mixer, discharging the concrete and lowering the mixer again.

10. A concrete mixing plant as defined in claim 1, including a cement-holding silo having an outlet arranged to discharge cement into said container when in its said lower position.

11. A concrete mixing plant as defined in claim 10, including a dispensing device arranged to receive cement from said silo, weigh the same, and to deliver said weighed cement into said container.

12. A concrete mixing plant as defined in claim 11, including a tank for water arranged around the outside of said dispensing device.

13. A concrete mixing plant as defined in claim 10, including spray means for directing a curtain of water spray into said container, said means being arranged so that said curtain encloses cement being discharged into said container.

14. A concrete mixing plant as defined in claim 13, wherein said spray means comprises pipes having nozzles arranged to define said curtain.

15. A concrete mixing plant as defined in claim 13, wherein said spray means comprises a ring-shaped pipe having water discharge openings arranged to produce a circular curtain of spray.

16. A concrete mixing plant as defined in claim 13, including control means for controlling discharge of cement into said container and control means for controlling flow of water in said spray means; both said control means being interconnected so that cement and water are discharged simultaneously.

References Cited

UNITED STATES PATENTS

| | | | |
|---|---|---|---|
| 3,021,122 | 2/1962 | Maxon | 259—171 |
| 3,218,044 | 11/1965 | Domeninghett | 259—154 |

FOREIGN PATENTS

| | | |
|---|---|---|
| 1,292,163 | 3/1962 | France. |
| 853,443 | 11/1960 | Great Britain. |

WALTER A. SCHEEL, *Primary Examiner.*

R. W. JENKINS, *Assistant Examiner.*